(12) United States Patent
Bhatawdekar et al.

(10) Patent No.: US 8,862,699 B2
(45) Date of Patent: Oct. 14, 2014

(54) REPUTATION BASED REDIRECTION SERVICE

(75) Inventors: Ameya S. Bhatawdekar, Issaquah, WA (US); Kristofer N. Iverson, Redmond, WA (US); Elliott J. Haber, Fall City, WA (US); John L. Scarrow, Sammamish, WA (US); Chad W. Mills, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 383 days.

(21) Appl. No.: 12/637,673

(22) Filed: Dec. 14, 2009

(65) Prior Publication Data

US 2011/0145435 A1 Jun. 16, 2011

(51) Int. Cl.
| | |
|---|---|
| G06F 15/16 | (2006.01) |
| G06F 7/04 | (2006.01) |
| H04L 29/06 | (2006.01) |
| G06F 21/64 | (2013.01) |
| G06F 21/56 | (2013.01) |
| G06F 17/30 | (2006.01) |
| H04L 9/32 | (2006.01) |

(52) U.S. Cl.
CPC .......... *H04L 63/1466* (2013.01); *H04L 63/123* (2013.01); *G06F 21/64* (2013.01); *G06F 21/566* (2013.01); *H04L 9/3223* (2013.01); *G06F 17/30887* (2013.01); *H04L 63/1483* (2013.01); *G06F 2221/2119* (2013.01)
USPC .............................. 709/219; 726/30; 709/245

(58) Field of Classification Search
CPC ....... H04L 9/32; H04L 9/3223; H04L 9/0643; H04L 63/1441; G06F 17/30861; G06F 17/30876; G06F 17/30887; G06F 21/64

USPC ........... 709/245, 201, 203, 217–219; 726/23, 726/25, 27, 30
See application file for complete search history.

(56) References Cited

U.S. PATENT DOCUMENTS

| | | | |
|---|---|---|---|
| 5,572,643 A | 11/1996 | Judson | |
| 6,367,012 B1 | 4/2002 | Atkinson et al. | |
| 6,571,256 B1 | 5/2003 | Dorian et al. | |
| 6,745,367 B1 | 6/2004 | Bates et al. | |
| 6,819,336 B1 | 11/2004 | Nielsen | |
| 6,892,178 B1 | 5/2005 | Zacharia | |
| 7,003,522 B1 | 2/2006 | Reynar et al. | |
| 7,107,530 B2 | 9/2006 | Blakely et al. | |
| 7,539,776 B1 * | 5/2009 | Saare et al. | 709/247 |
| 7,562,304 B2 * | 7/2009 | Dixon et al. | 715/738 |
| 7,580,982 B2 | 8/2009 | Owen et al. | |
| 7,797,421 B1 * | 9/2010 | Scofield et al. | 709/224 |
| 7,831,915 B2 * | 11/2010 | Averbuch et al. | 715/738 |

(Continued)

OTHER PUBLICATIONS

Jain, R., N. Jain, and S. Nandi. "Secure Group Browsing." (2003).*

(Continued)

*Primary Examiner* — Patrice Winder
*Assistant Examiner* — Julian Chang
(74) *Attorney, Agent, or Firm* — Bryan Webster; Andrew Sanders; Micky Minhas

(57) ABSTRACT

A reputation based redirection service is usable to build URL wrappers for un-trusted and unknown URLs. Such URL wrappers can be used to protect Web users by, for example, redirecting traffic to interstitial Web pages. Additionally, reputation decisions can be made by the service to further protect users from malicious URLs.

20 Claims, 8 Drawing Sheets

(56) References Cited

U.S. PATENT DOCUMENTS

| | | | |
|---|---|---|---|
| 7,870,203 B2 | 1/2011 | Judge et al. | |
| 7,886,032 B1* | 2/2011 | Louz-On | 709/223 |
| 7,930,289 B2* | 4/2011 | Cheshire | 707/709 |
| 7,966,553 B2 | 6/2011 | Iverson | |
| 8,281,361 B1* | 10/2012 | Schepis et al. | 726/1 |
| 8,434,149 B1* | 4/2013 | Satish et al. | 726/22 |
| 2003/0018585 A1 | 1/2003 | Butler et al. | |
| 2003/0028762 A1 | 2/2003 | Trilli et al. | |
| 2003/0097591 A1 | 5/2003 | Pham et al. | |
| 2003/0188019 A1 | 10/2003 | Wesley | |
| 2004/0122926 A1 | 6/2004 | Moore et al. | |
| 2004/0210602 A1 | 10/2004 | Hillis et al. | |
| 2005/0050470 A1 | 3/2005 | Hudson et al. | |
| 2005/0246761 A1* | 11/2005 | Ross et al. | 726/1 |
| 2005/0262026 A1* | 11/2005 | Watkins | 705/67 |
| 2006/0004914 A1* | 1/2006 | Kelly et al. | 709/219 |
| 2006/0015722 A1 | 1/2006 | Rowan et al. | |
| 2006/0095404 A1 | 5/2006 | Adelman et al. | |
| 2006/0218403 A1 | 9/2006 | Sauve et al. | |
| 2006/0253580 A1* | 11/2006 | Dixon et al. | 709/225 |
| 2006/0253582 A1* | 11/2006 | Dixon et al. | 709/225 |
| 2006/0253584 A1 | 11/2006 | Dixon et al. | |
| 2007/0011603 A1 | 1/2007 | Makela | |
| 2007/0050716 A1* | 3/2007 | Leahy et al. | 715/706 |
| 2007/0078699 A1 | 4/2007 | Scott et al. | |
| 2007/0118898 A1* | 5/2007 | Morgan et al. | 726/22 |
| 2007/0124414 A1* | 5/2007 | Bedingfield et al. | 709/217 |
| 2007/0136279 A1* | 6/2007 | Zhou et al. | 707/6 |
| 2007/0136806 A1* | 6/2007 | Berman | 726/22 |
| 2007/0162349 A1 | 7/2007 | Silver | |
| 2007/0168490 A1* | 7/2007 | Kent et al. | 709/223 |
| 2007/0192855 A1 | 8/2007 | Hulten et al. | |
| 2007/0208613 A1 | 9/2007 | Backer | |
| 2007/0250916 A1 | 10/2007 | Shull et al. | |
| 2008/0021958 A1* | 1/2008 | Foote | 709/204 |
| 2008/0022384 A1 | 1/2008 | Yee et al. | |
| 2008/0082662 A1* | 4/2008 | Dandliker et al. | 709/225 |
| 2008/0109306 A1* | 5/2008 | Maigret et al. | 705/14 |
| 2008/0109473 A1* | 5/2008 | Dixon et al. | 707/102 |
| 2008/0114709 A1* | 5/2008 | Dixon et al. | 706/13 |
| 2008/0172382 A1* | 7/2008 | Prettejohn | 707/6 |
| 2008/0196099 A1* | 8/2008 | Shastri | 726/12 |
| 2008/0243920 A1 | 10/2008 | Newman et al. | |
| 2008/0256187 A1* | 10/2008 | Kay | 709/206 |
| 2008/0288278 A1 | 11/2008 | Buss | |
| 2008/0307044 A1* | 12/2008 | Musson | 709/203 |
| 2009/0076994 A1 | 3/2009 | Ghosh et al. | |
| 2009/0204677 A1 | 8/2009 | Michaelis et al. | |
| 2009/0282052 A1* | 11/2009 | Evans et al. | 707/10 |
| 2009/0300012 A1* | 12/2009 | Levow et al. | 707/6 |
| 2010/0042487 A1* | 2/2010 | Barazani | 705/14.13 |
| 2010/0057895 A1* | 3/2010 | Huang | 709/222 |
| 2010/0076890 A1* | 3/2010 | Low et al. | 705/44 |
| 2010/0153404 A1* | 6/2010 | Ghosh et al. | 707/748 |
| 2010/0174795 A1* | 7/2010 | Adelman et al. | 709/206 |
| 2010/0223251 A1* | 9/2010 | Adelman et al. | 707/706 |
| 2010/0235918 A1* | 9/2010 | Mizrahi et al. | 726/25 |
| 2010/0268739 A1* | 10/2010 | Zalepa | 707/782 |
| 2010/0332837 A1* | 12/2010 | Osterwalder | 713/172 |
| 2011/0004693 A1 | 1/2011 | Rehfuss | |
| 2011/0030058 A1* | 2/2011 | Ben-Itzhak et al. | 726/24 |
| 2011/0050428 A1* | 3/2011 | Istoc | 340/573.1 |
| 2011/0087647 A1* | 4/2011 | Signorini et al. | 707/709 |
| 2011/0126259 A1* | 5/2011 | Krishnamurthi et al. | 726/1 |
| 2011/0126289 A1* | 5/2011 | Yue et al. | 726/26 |
| 2011/0173683 A1* | 7/2011 | Roach | 726/4 |
| 2011/0191849 A1 | 8/2011 | Jayaraman et al. | |
| 2011/0225652 A1* | 9/2011 | Emigh et al. | 726/22 |
| 2011/0258201 A1* | 10/2011 | Levow et al. | 707/748 |
| 2012/0131636 A1* | 5/2012 | Ross et al. | 726/1 |

OTHER PUBLICATIONS

Garuba, Moses, and Jiang Li. "Preventing parameterized vulnerability in Web based applications." Information Technology, 2007. ITNG'07. Fourth International Conference on. IEEE, 2007.*

"InterScan Web Security Suite 3.1", retrieved on Jun. 30, 2010 at <<http://www.mcafee.com/us/local_content/solution_briefs/web_gateway_sb.pdf>>, Trend Micro, 2008, pp. 1-2.

Josang, et al., "A Survey of Trust and Reputation Systems for Online Service Provision", retrieved on Jun. 30, 2010 at <<http://citeseerx.ist.psu.edu/viewdoc/download?doi=10.1.1.60.1963&rep=rep1&type=pdf>>, Elsevier Science Publishers, Decision Support Systems, vol. 43, No. 2, Mar. 2007, pp. 618-644.

U.S. Appl. No. 11/759,401, filed Jun. 7, 2007, Iverson, "Accessible Content Reputation Lookup".

"Actipro SyntaxEditor—Windows Forms .NET Control", available at least as early as Feb. 22, 2007, at <<http://www.actiprosoftware.com/Products/DotNet/WindowsForms/SyntaxEditor/SmartTag>>, Actipro Software LLC, 1999-2007, pp. 1-2.

"Complete Tasks Quickly with Smart Tags in Office XP", available at least as early as Feb. 22, 2007, at <<http://office.microsoft.com/en-us/help/HA010347451033.aspx>>, Microsoft Corporation, 2007, pp. 1-11.

"Interfaces in Visual Studio 2005", available at least as early as Feb. 22, 2007, at <<http://safari.oreilly.com/0596102070/pnetcomp2-CHP-3-SECT-5>>, Safari Books Online, 2006, pp. 1-3.

Office action for U.S. Appl. No. 12/859,679, mailed on May 7, 2013, Colvin et al., "Reputation-based Safe Access User Experience", 14 pages.

Office action for U.S. Appl. No. 12/859,679, mailed on Aug. 8, 2012, Colvin et al., "Reputation-based Safe Access User Experience", 15 pages.

Office action for U.S. Appl. No. 12/859,679, mailed on Jan. 2, 2014, Colvin, et al., "Reputation-based Safe Access User Experience", 15 pages.

Office action for U.S. Appl. No. 12/859,679, mailed on Sep. 25, 2013, Colvin, et al., "Reputation-based Safe Access User Experience", 15 pages.

* cited by examiner

REPUTATION BASED REDIRECTION SERVICE

BACKGROUND

Today for many World Wide Web users (Web users), the Internet can be a dangerous place full of malicious and abusive websites. By clicking on a hyperlink, a Web user is directed to a Web document (e.g., a website) residing somewhere on a Web-enabled server. Unfortunately, the website requested may often lead to abuse, and with the ability to cheaply disseminate abusive hyperlinks, abuse cases are on the rise.

The location of a website is described by a Uniform Resource Locator (URL) which defines the precise network location of the resource. However, a URL does not indicate the characteristics or reputation of the resource or of the network (or website) where the resource resides. Additionally, a URL can easily disguise the actual location of the resource, such that a Web user may be tricked into accessing a website different from what they intended.

In virtually all abuse cases, the intended victim is directed to an abuse website where they are attacked. The victim's personal credentials may be stolen, the victim's machine may be infected with malware or some other virus, or the victim may be subjected to spam. In any case, serious damage may be inflicted on an innocent and unsuspecting user.

Unfortunately, adequate tools do not exist for checking the reputation of a URL prior to accessing a website. Redirection services, while available, are used in a small subset of instances. When used, existing redirection services merely redirect a Web user to alternate websites, and lack the ability to avoid abuse through reputation lookup. Accordingly, there is a need for a service that can further aid Web users in avoiding abuse websites.

BRIEF SUMMARY

This summary is provided to introduce simplified concepts for a reputation based redirection service, which is further described below in the Detailed Description. This summary is not intended to identify essential features of the claimed subject matter, nor is it intended for use in determining the scope of the claimed subject matter. Generally, the reputation based redirection service described herein involves building a URL wrapper to allow for the avoidance of abusive websites by redirecting Web users to interstitial pages.

In one aspect, a URL wrapper may be built by combining a received URL, a determined characteristic of the URL, and a created security hash. The determined characteristic may be a unique identifier of a user who originally posted the URL and/or a location on a network where the URL was originally posted. The URL wrapper my also determine if a URL is trusted, in which case it may output the original URL. The URL wrapper may output an error message when the URL is invalid or based on an un-supported Uniform Resource Identifier (URI) schema, or it may point to a redirection service.

In another aspect, a redirection service may be configured to receive a request for handling a wrapped URL, verify the authenticity of the wrapped URL, determine the reputation rating of the wrapped URL, and output a redirection decision based on the validity and/or the reputation rating of the wrapped URL. The wrapped URL may contain a destination URL, a security hash, a unique identifier of a user who originally posted the destination URL, and/or a location where the destination URL was originally posted. The redirection service may also be configured to handle shortened and/or previously redirected URLs by unraveling a shortened and/or previously redirected URL to determine and output a final destination URL. The redirection service may also be configured to receive and process click-through telemetry information in the form of a telemetry report, store redirection action data and the telemetry reports to a log file, and maintain system configuration settings. Additionally, the redirection service may determine, based on the reputation rating of the wrapped URL, when to display one of the interstitial pages. Interstitial pages may be, but are not limited to, abuse information pages, unknown information pages, and/or error information pages.

In yet another aspect, a URL reputation based redirection service may be implemented as a Web service call which may be configured to receive a Web service call for a URL, determine a redirection decision for the URL, and output the redirection decision. The redirection decision may be based on a reputation rating of the URL. Additionally, the URL may be wrapped to include the destination URL, a security hash code, a unique identifier of the user who originally posted the destination URL, and/or the location where the destination URL was originally posted.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes a reputation based redirection service. In particular, systems and methods are presented for wrapping a URL with its characteristics, checking and logging the reputations of destination URLs, and redirecting users to interstitial Web pages when destination URLs lead to known or suspected abuse websites or have unknown reputations.

As discussed above, Web abuse cases are potentially damaging to Web users and their equipment, and are becoming more prevalent as the size of the Internet and the relative ease of distributing abusive hyperlinks increases. These issues could potentially lead to more distrust and less use of the Internet by casual Web surfers, and could even have detrimental effects on the economy.

The techniques described in this disclosure may be used for effectively avoiding abuse websites by creating URL wrappers, checking destination URL reputations, and redirecting Web users away from the abuse. The URL wrapper allows the characteristics of the URL to be stored with redirection information to convert URLs into safe hyperlinks. Thus, a user need only select a hyperlink in a Web document (i.e., a URL) without being concerned for the safety of the intended destination.

URL wrapping entails appending data to a URL to add functionality and/or for redirection purposes. In one example, as discussed below, the URL to which data may be appended may be the URL of a redirection service. A system for reputation look-up is also disclosed that allows for redirection only when appropriate, and gives the user click-through options. Additionally, the ability to receive and handle Web service calls for reputation look-up and redirection is disclosed that allows various Web applications to access the system.

For creating wrapped URLs, an illustrative URL wrapping component is described that receives destination URLs (e.g., hyperlinks selected by users) and may convert them to wrapped URLs that can be processed by the redirection service. Prior to wrapping, an enhanced URL may be created by appending the destination URL's characteristics, and possibly additional parameters, to the destination URL itself. A security hash, created based on the enhanced URL, may then be appended to the enhanced URL to form a wrapped URL.

In some examples, the redirection service may provide the user with an interstitial Web page indicating that the intended destination is a known or suspected abuse website. In other examples, the interstitial page may indicate that the reputation of the intended destination is unknown or that an error occurred. Alternatively, the redirection service may send the user directly to the destination site indicating that the website is known to be non-abusive.

Figure 1:
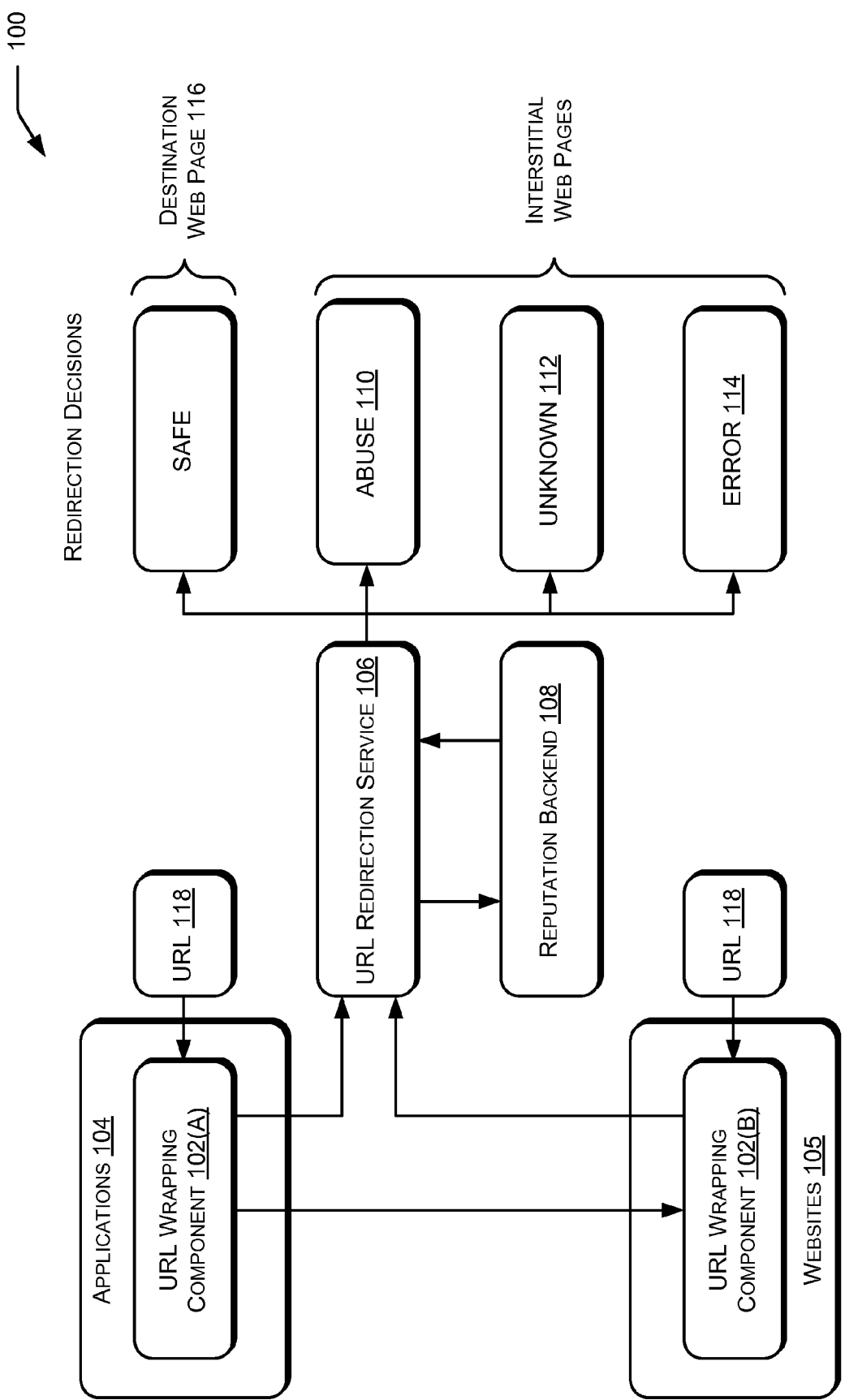
FIG. 1 is a block diagram of an illustrative system for a reputation based redirection service.

FIG. 1 depicts an illustrative block diagram illustrating a high-level overview of a reputation based redirection service system 100. The system 100 includes a URL wrapping component 102 which may be embedded in various applications 104 and/or websites 105. For example, the URL wrapping component 102 may be part of a client application 104 (e.g., email client, word processor, etc.) and/or may be part of a Web service at a host. Additionally, system 100 includes a URL redirection service 106, a reputation backend 108, several interstitial Web pages 110-114, and destination Web page 116.

A URL 118 may be selected by a Web user (not shown) from at least one of many possible locations. URL 118 may reside in various applications 104 and/or websites 105, or it may be entered into applications 104 and/or websites 105 (e.g., typed by the user). After URL 118 is recognized by the URL wrapping component 102(A) of application(s) 104, either by user selection, user creation, or some other method, the URL may be wrapped with various appropriate characteristics for processing by the URL redirection service 106 or by the URL wrapping component 102(B) of website(s) 105. Alternatively, URL 118 may be recognized directly by URL wrapping component 102(B) of websites 105 and then sent to URL redirection service 106.

The URL redirection service 106 may determine that the URL 118 describes a website that is safe, abusive, unknown, or inaccurate. The redirection service 106 may make use of a reputation backend 108 to determine a reputation decision for the URL 118. Reputation backend 108 may make the decision for the URL redirection service 106 or it may supply reputation data to URL redirection service 106 so that the URL reputation service 106 can make the reputation decision. Reputation backend 108 may make a redirection decision based on the reputation of the URL, the reputation of the user who posted the URL, the reputation of the website or application where the URL was originally posted, or based on the traffic to the URL. By way of example, and not limitation, reputation backend 108 may decide to block low reputation URLs posted by users with low reputations or by users in a low account tier, it may decide to block all URLs posted by users with low reputation or by users in a low account tier, or it may decide to block traffic to low reputation URLs after a certain traffic threshold (e.g., more than 10 visits to the URL in one day) is met. Redirection may also be based on configurable business rules applied to other data stored in the wrapped URLs, such as characteristics, site, user, URL, hash, etc. Additionally, traffic thresholds may be used for real-time throttling of unknown URLs. For example, when a traffic threshold is met for a particular URL, reputation backend 108 may flag that URL as abusive even if no reputation information exists for that URL. In this way, potential abuse sites can be avoided prior to obtaining a reputation.

Once a reputation decision has been determined the URL reputation service 106 may direct or redirect the Web user to at least one of several types of Web pages. For example, in one aspect, the reputation decision may instruct URL reputation service 106 to send the user directly to the destination Web page 116 because the URL 118 was deemed safe. In another aspect, the URL 118 may be deemed abusive, in which case the URL reputation service 106 may redirect the user to an "abuse" interstitial Web page 110. The abuse interstitial Web page may, for example, inform the user that the URL 118 is attempting to direct them to a known abuse website. In another aspect, the URL 118 may point to a website for which the reputation is unknown. In this case, the URL reputation service 106 may redirect the user to an "unknown" interstitial page 112 which may inform the user that the URL 118 is pointing to a website with little or no known reputation data. By way of example, and not limitation, the "abuse" interstitial page 110 and/or the "unknown" interstitial page 112 may provide the user with options for reporting the abuse, ignoring the recommendation to avoid, or avoiding the abusive/unknown website and returning to the user's original Web document. In yet another aspect, the URL redirection service 106 may determine that an error occurred and redirect the user to an "error" interstitial page 114.

FIG. 1 provides simplified examples of suitable URL wrapping and URL redirection service systems according to the present disclosure. However, other configurations are also possible. For example, while the reputation backend 108 is shown as a separate component, it may be combined with the URL redirection service 106. Further, URL 118 may reside in non-Web documents and URL wrapping component 102 could be used to wrap URLs that do not reside in Web documents or applications used in conjunction with the Internet, for example, plain text documents, word processing documents, spreadsheet documents, and even Web documents (such as hypertext markup language (HTML) documents) that are not available over any networks but are stored locally or on non-networked devices.

Illustrative Computing Environment

Figure 2:
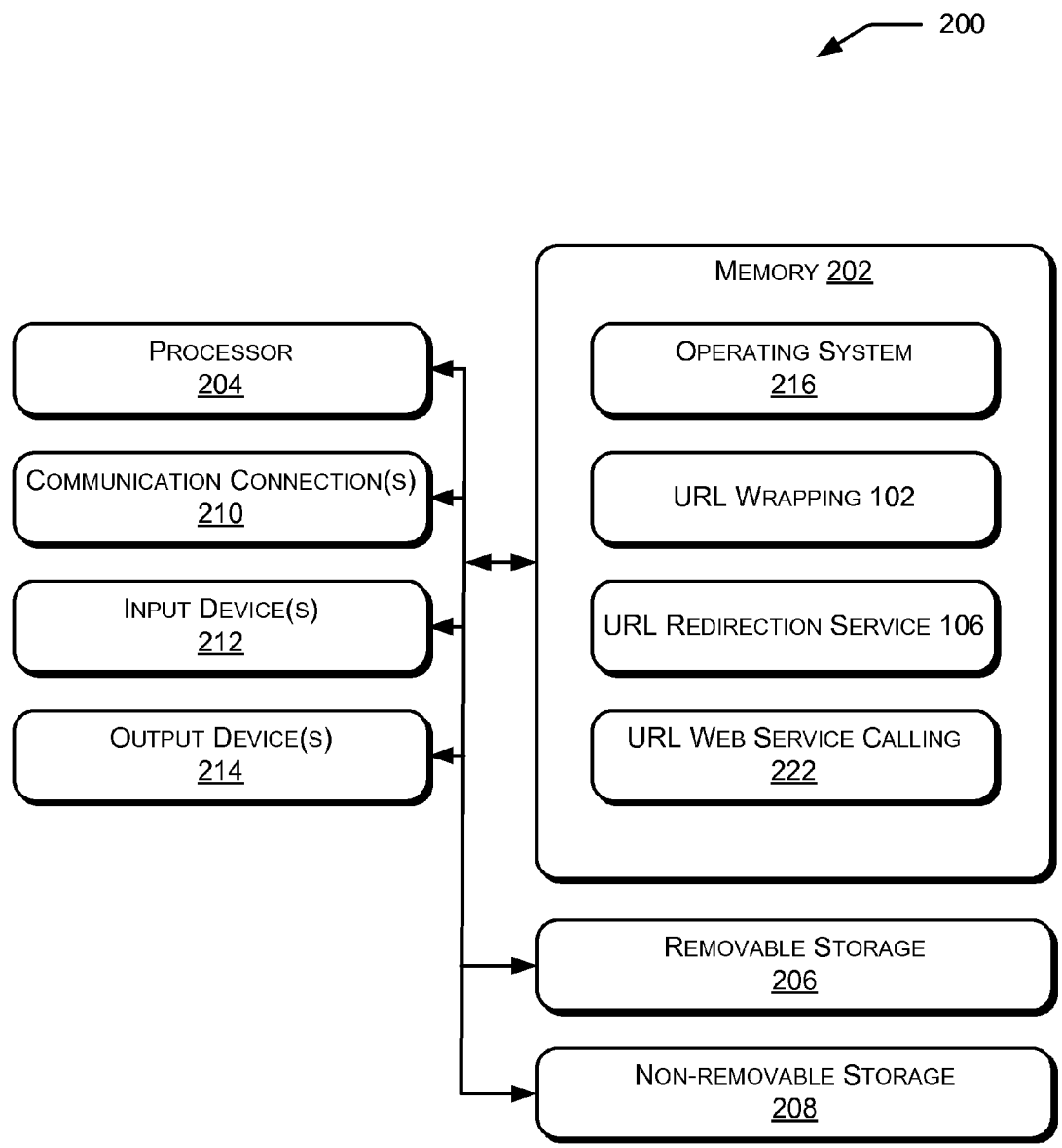
FIG. 2 is a block diagram of a computer environment showing an illustrative system in which a reputation based redirection service system can be implemented.

FIG. 2 provides an illustrative overview of one computing environment 200, in which aspects of the invention may be implemented. The computing environment 200 may be configured as any suitable computing device capable of implementing a reputation based redirection service. By way of example and not limitation, suitable computing devices may include personal computers (PCs), servers, server farms, datacenters, or any other device capable of storing and executing all or part of the redirection service.

In one illustrative configuration, the computing environment 200 comprises at least a memory 202 and one processing unit (or processor) 204. The processor 204 may be implemented as appropriate in hardware, software, firmware, or combinations thereof. Software or firmware implementations of the processor 204 may include computer-executable or machine-executable instructions written in any suitable programming language to perform the various functions described.

Memory 202 may store program instructions that are loadable and executable on the processor 204, as well as data generated during the execution of these programs. Depending on the configuration and type of computing device, memory 202 may be volatile (such as random access memory (RAM)) and/or non-volatile (such as read-only memory (ROM), flash memory, etc.). The computing device or server may also include additional removable storage 206 and/or non-removable storage 208 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 202 may include multiple different types of memory, such as static random access memory (SRAM), dynamic random access memory (DRAM), or ROM.

Memory 202, removable storage 206, and non-removable storage 208 are all examples of computer-readable storage media. Computer-readable storage media includes, but is not limited to, volatile and non-volatile, removable and non-removable media implemented in any method or technology for storage of information such as computer-readable instructions, data structures, program modules or other data. Memory 202, removable storage 206, and non-removable storage 208 are all examples of computer storage media. Additional types of computer storage media that may be present include, but are not limited to, phase change memory (PRAM), SRAM, DRAM, other types of RAM, ROM, electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the server or other computing device. Combinations of any of the above should also be included within the scope of computer-readable storage media.

The computing environment 200 may also contain communications connection(s) 210 that allow the computing environment 200 to communicate with a stored database, another computing device or server, user terminals, and/or other devices on a network, such as applications 104 and/or websites 105 of FIG. 1.

The computing environment 200 may also include input device(s) 212 such as a keyboard, mouse, pen, voice input device, touch input device, etc., and output device(s) 214, such as a display, speakers, printer, etc.

Turning to the contents of the memory 202 in more detail, the memory 202 may include an operating system 216 and one or more application programs or services for implementing the reputation based redirection service system 100. Reputation based redirection service system 100, however, may be implemented via either a Web service host or a client application. For example, when implemented by a Web service host, the memory 202 may include a URL wrapping module 102. The URL wrapping module 102 includes, but is not limited to, logic configured to build a URL wrapper containing a received URL, characteristics of the URL, and a security hash code. In one aspect, the URL wrapping module 102 is located in the memory 202 as shown in FIG. 2. Alternatively, however, the URL wrapping module 102 may be located onboard the processor 204. As discussed in further detail, URL wrapping module 102 includes, but is not limited to, logic configured to wrap a received URL with a redirection service URL, the received URL itself, determined characteristics of the received URL, and a created security hash code.

The memory 202 may further include a URL redirection service 106 and a URL Web service calling module 222. The URL redirection service 106 may be configured to redirect a user to informational interstitial Web pages in lieu of directing them to the intended destination. The URL Web service calling module 222 includes, but is not limited to, logic configured to allow Web applications to utilize the URL redirection service 106 much like an Application Programming Interface (API) without first using the URL wrapping module 102. That is, a Web application may make a call to the URL Web service calling module 222 with an unwrapped URL, based on the protocol set out by the URL Web service calling module 222, and receive a redirection decision or an interstitial Web page in return. In other words, the URL Web service calling module 222 may expose the methods of the URL redirection service 106 for use by Web applications.

Alternatively, as discussed above, the reputation based redirection service 100 may be implemented entirely by a client application, rather than a Web service host as previously described. In this aspect, memory 202 may include operating system 216 and URL wrapping module 102; however, it may not include URL redirection service 106 and URL web service calling module 222.

Illustrative URL Wrapping

Figure 3:
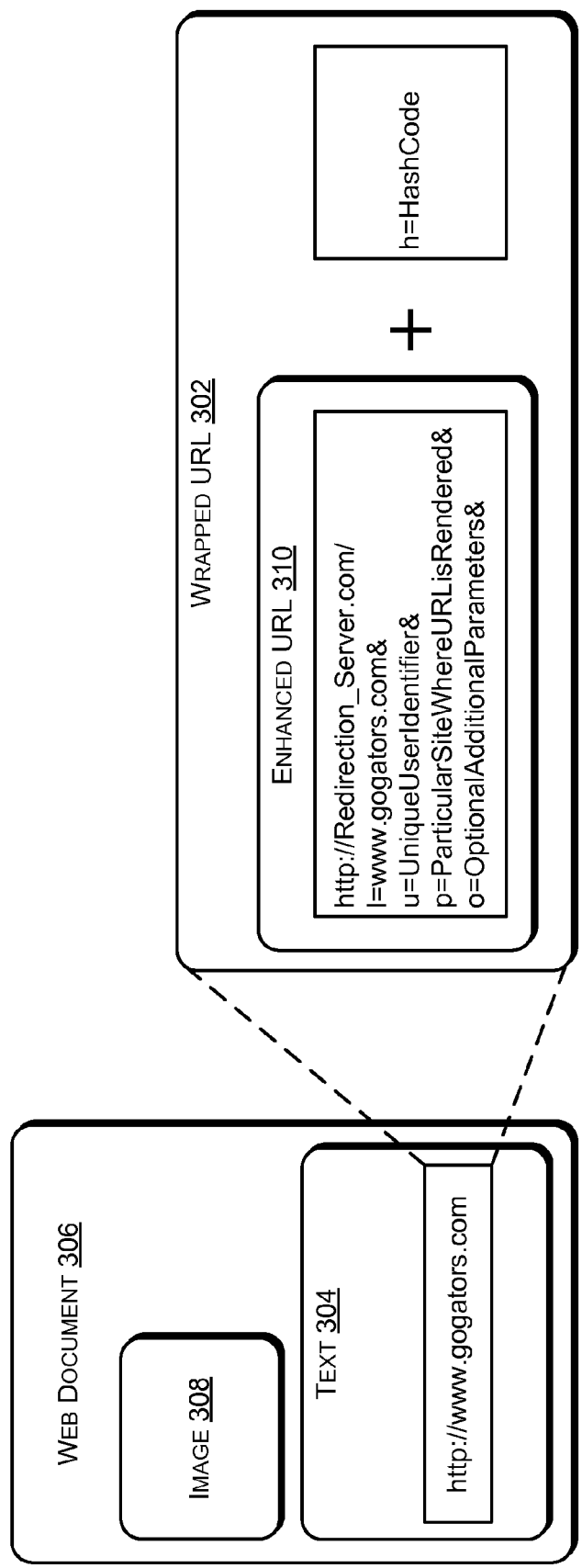
FIG. 3 is a schematic diagram of an illustrative system for URL wrapping for a reputation based redirection service.

FIG. 3 is an illustrative schematic diagram illustrating a wrapped URL 302 stored within text 304 of Web document 306. By way of example, and not limitation, Web document 306 may also include image 308. However, virtually any Web document layout may be used to store wrapped URL 302. Additionally, virtually any type of Web document may store wrapped URL 302, e.g., a document on a server available through the Internet, a website, an email message. Further, by way of example, and not limitation, Web document 306 may be located on a network such as the Internet, and its specific location may be described by a URL, or it may be a document that is not available over any network.

In one aspect, wrapped URL 302 may contain data received from an input device (not shown), data determined to be a characteristic of the received data, additional optional data, hash code data, and redirection service data. By way of example, and not limitation, wrapped URL 302 contains enhanced URL 310 containing the URL of URL redirection service 106, the received intended destination URL (i.e., the URL selected by the user that may or may not be abusive), several characteristics of the received intended destination, and optional additional parameters. Examples of optional additional parameters may, but need not, include informational identifiers for looking-up wrapped URL information at the reputation backend 108 of FIG. 1. In one example, this informational identifier may be used in combination with the received intended destination URL and other wrapped elements. In another example, the informational identifier may be used in lieu of the enhanced URL elements, and may direct the URL redirection service 106 to look-up the additional elements at the reputation backend 108.

Additionally, wrapped URL 302 may also contain a security hash code. In this example, the URL for URL redirection service 106 is http://Redirection_Server.com/ and the destination URL selected by the user is http://www.gogators.com (however, the wrapped URL may not include the http identifier for the destination URL). Additionally, by way of example, and not limitation, wrapped URL 302 contains the unique user identifier of the user who originally posted the destination URL (www.gogators.com), the particular website or document where the destination URL was originally posted, optional additional parameters relating to URL reputation based redirection, and a security hash code.

In one aspect, the redirection service URL points the wrapped URL to URL redirection service 106 for processing. The redirection service 106 may then determine, based on the destination URL, the unique user identifier, and the data describing the particular site where the URL was rendered, whether the destination URL is abusive, unknown, or safe. In another aspect, the redirection service may determine whether the destination URL is abusive, unknown, or safe, based on data known, or retrievable, by the reputation backend 108. By way of example, and not limitation, reputation backend 108 may do a Domain Name System (DNS) look-up to determine what Internet Protocol (IP) address is hosting a particular URL. In another example, the reputation backend 108 may already have reputation information about a particular URL stored within its memory. Optional additional parameters may be used for any other features that may be found to be helpful, and the security hash code may be used by URL redirection service 106 to validate, or authenticate, that the wrapped URL 302 has not been maliciously, or unintentionally, tampered with.

In one aspect, the security hash code is created based on the enhanced URL 310 prior to completing wrapped URL 302. For example, the URL wrapping component 102 may generate a security hash with a secret key based on the characteristics of the URL seen in enhanced URL 310. This security hash may then be appended to the query string to form wrapped URL 302 that contains the characteristics of enhanced URL 310 plus the security hash code.

Figure 4:
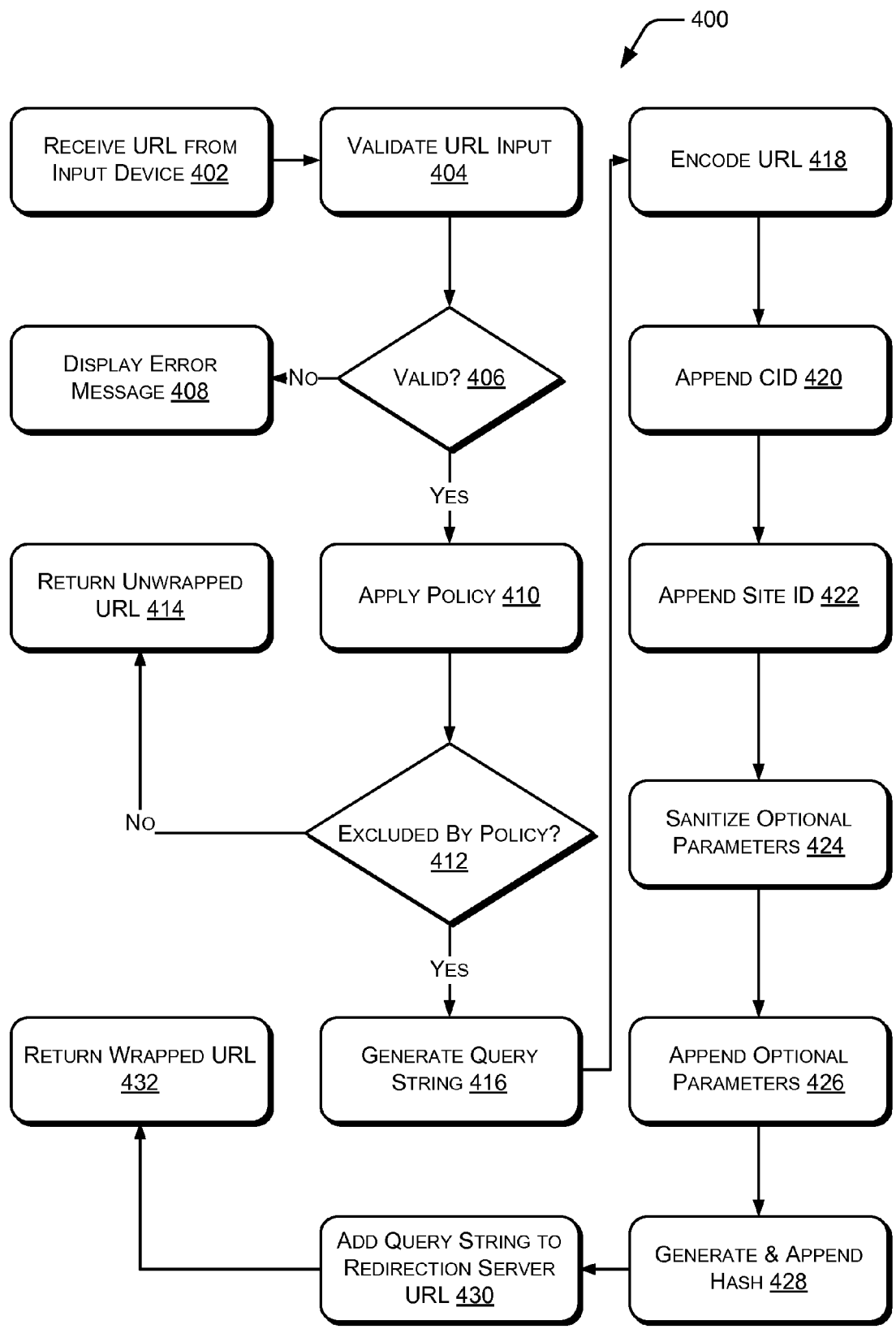
FIG. 4 is a flowchart illustrating details of an illustrative URL wrapping method for a reputation based redirection service.

FIG. 4 is a flow diagram of one illustrative method 400 of URL wrapping. As discussed above, URL wrapping is the process of appending additional data to a URL to add functionality to the URL or for redirection purposes. The method 400 may, but need not necessarily, be implemented using the reputation based redirection service system 100 shown in FIG. 1. In this particular implementation, the method 400 begins at block 402 in which the method 400 receives a URL from an input device. Often, the URL being received will be a URL selected by a user of a website or Web application; however, the URL may also be manually entered by a user, or copied and pasted into a browser's address bar. At block 404, method 400 will attempt to validate the received URL. At decision block 406, the method 400 determines whether the URL is valid. By way of example, and not limitation, the determination of validity may be based on whether the URL is malformed, is of an un-supported URI schema, is missing characters or is null, and/or is too long.

If the URL is not valid, method 400 will terminate at block 408 by displaying an error message on an interstitial Web page to the user. If, on the other hand, the URL is valid, method 400 will continue to block 410 and apply a configurable policy. By way of example, and not limitation, the policy may be configured to exclude all in-network URLs or all trusted URLs. At decision block 412, method 400 determines whether the URL is excluded by the policy. If the URL is excluded (e.g., the URL belongs to the redirection services own network), method 400 will terminate by returning an unwrapped URL, thus allowing the user to proceed directly to the intended destination URL. However, if the URL is not excluded from the policy, method 400 will generate a query string for the wrapped URL 302 at block 416. The query string generated at block 416 may contain many different parameters. As one example of a possible query string, method 400 may encode the received URL at block 418, append the unique user identifier (CID) of the person or application which originally posted the URL at block 420, append the unique website identifier (site ID) where the URL was posted at block 422, sanitize optional parameters at block 424, append the sanitized optional parameters at block 426, and generate and append a security hash code at block 428. In this example, the encoded URL, CID, site ID, sanitized parameters, and generated hash code are all appended to the query string; however, other query strings are possible. As discussed above, the security hash code may be generated at block 428 based on the enhanced URL. In this example, the enhanced URL may include the contents of the query string prior to the generation of the security hash (or after block 426, i.e., the encoded URL, CID, site ID, and sanitized parameters).

Once method 400 has completed the generation of the query string (including appending the generated security hash), blocks 416-428, method 400 will add the query string to the redirection server URL (e.g., http://Redirection_Server.com of FIG. 3) at block 430 to form wrapped URL 302. Method 400 may then terminate by returning the wrapped URL as output at block 432.

Illustrative Redirection Service

Figure 5:
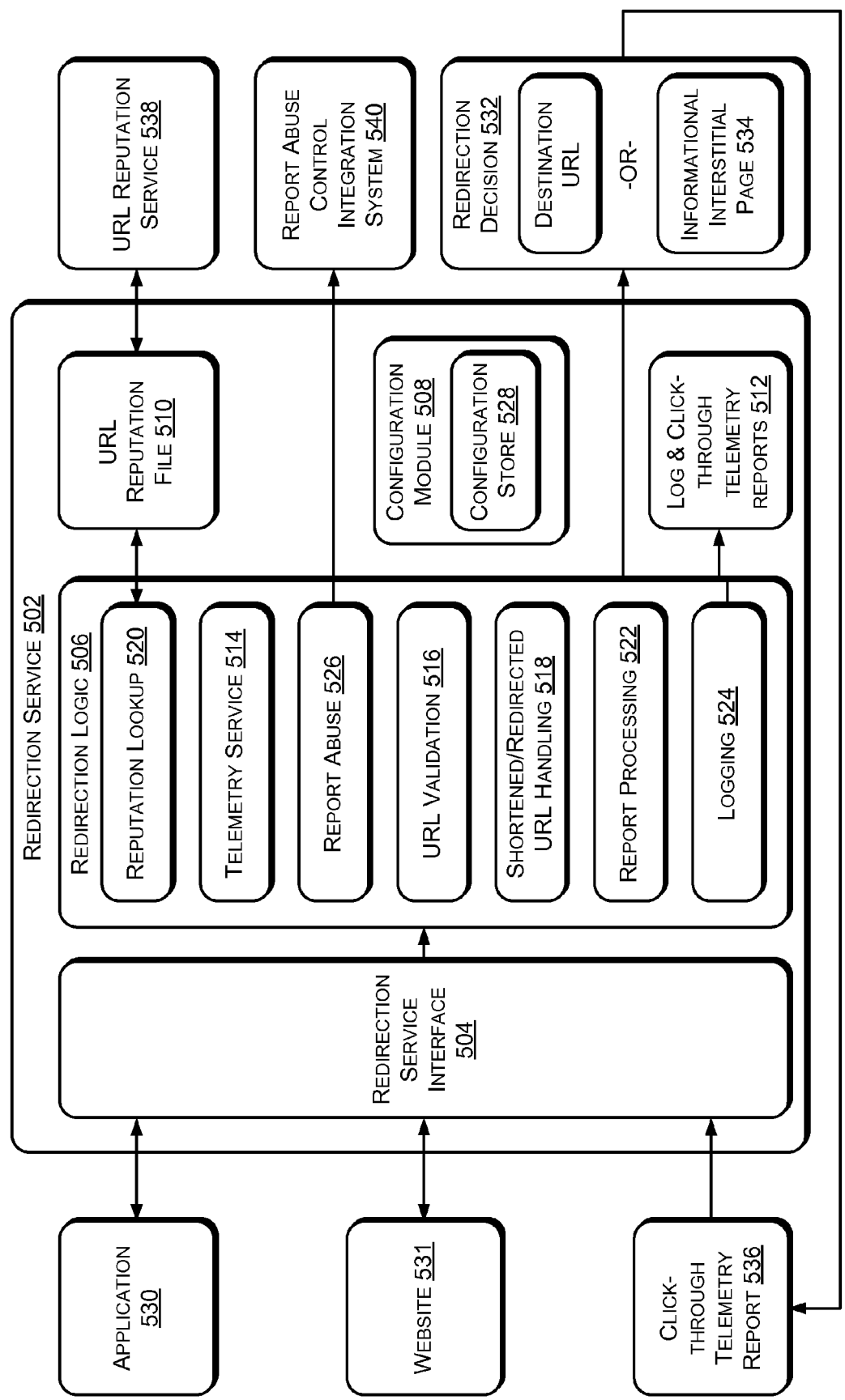
FIG. 5 is a block diagram of an illustrative system for a reputation based redirection service.

FIG. 5 is an illustrative schematic diagram illustrating a redirection service 502 which may contain a redirection service interface 504, a redirection logic component 506, a configuration module 508, a URL reputation file (URF) 510, and log and click-through telemetry reports 512. By way of example, and not limitation, a redirection service may be configured to redirect Web users to interstitial pages when the requested URL is either invalid, abusive, or of unknown reputation. Turning to the contents of the redirection logic component 506 in more detail, the redirection logic component 506 may include a telemetry service module 514, a URL validation module 516, a shortened/redirected URL handling module 518, a reputation lookup module 520, a report processing module 522, a logging module 524, and a report abuse module 526. Additionally, configuration module 508 may contain a configuration store 528 for storing the configuration data of the redirection service.

Redirection service 502 may be communicatively coupled with application 530 or website 531 and may receive wrapped or unwrapped URLs as input from application 530 or website 531. By way of example, and not limitation, application 530 or website 531 may be communicatively coupled directly to redirection service interface 504. In turn, the redirection logic component 506 may include, but is not limited to, logic configured to output, through the redirection service 502, a redirection decision 532. Redirection decision 532 may be sent directly back to the application 530 or website 531 that input the wrapped or unwrapped URL, or it may be sent to another website or application. Additionally, by way of example, redirection logic component 506 may also include logic configured to output a numerical confidence score based on reputation data. Redirection service 502 may also be communicatively coupled with informational interstitial page 534, or a plurality of interstitial pages, by way of the redirection service interface 504. Through the communication link, informational interstitial page 534 may transmit click-through telemetry report 536 for processing and logging by the redirection service 502.

Redirection service 502 may also be communicatively coupled with a URL reputation system (URS) 538 and a report abuse control integration system 540. By way of example, and not limitation, reputation lookup module 520 of redirection logic component 506 may contain logic configured to create a URF 510 to be transmitted to URS 538 for lookup. URF 510 may contain the parameters of a wrapped or unwrapped URL for reputation lookup by URS 538. In turn, URS 538 may return URF 510 to reputation lookup module 520 to be handled by report processing module 522. Report processing module 522 may contain logic configured to use the data found in URF 510 for determining and outputting redirection decision 532. Additionally, and only by way of example, when redirection service 502 returns that a destination URL is bad, redirection decision 532 may direct a user to an abuse interstitial page 110 (as seen in FIG. 1) and report abuse module 526 may contain logic configured to call the report abuse control integration system 540. The report abuse control integration system 540 may work in conjunction with the URS 538 for storing data about known abuse cases.

Turning again to the contents of the redirection logic component 506, telemetry service module 514 may include, but is not limited to, logic configured to receive click-through telemetry report(s) 536 of the informational interstitial page(s) 534 by way of the redirection service interface 504. Click-through telemetry report 536 may contain data about the particular user (e.g., the user's CID) that is viewing informational interstitial page 534. It may also contain data associated with the wrapped or unwrapped URL that led to the informational interstitial page 534 (e.g., the URL poster's CID, the origination website, etc.). Telemetry service module 514 may include, but is not limited to, logic configured to process this data and make use of the logging module 524 to log appropriate data in the log and click-through telemetry reports 512. URL validation module 516 may be configured to implement business logic for verifying the validity of a wrapped URL. This verification may be done by checking the security hash code of the wrapped URL to ensure that it has not been tampered with. If the wrapped URL has been tampered with, the URL validation module 516 may send URL attributes to the logging module 524 and the report abuse module 526. Additionally, the report processing module 522 may be configured to make a redirection decision 532 without using the reputation lookup module 520.

The shortened/redirected URL handling module 518 may include, but is not limited to, logic configured to be used to process URLs that are themselves redirected, or have been shortened by a URL shortening service. By way of example, and not limitation, URL shortening services often shorten overbearingly long URLs. When redirection service 502 receives a wrapped URL that contains a shortened URL, shortened/redirected URL handling module 518 may have to first unravel the shortened URL to determine the final destination URL. Once the shortened/redirected URL handling module 518 finishes unraveling the shortened/redirected URL, it may pass the final destination URL to the reputation lookup module 520 for processing.

Logging module 524 may contain logic configured to log redirection actions to log files which may be contained in log and click-through telemetry reports 512. Redirection actions may contain data related to a redirection decision 532 that may have been sent by the report processing module 522 after receiving URF 510 from URS 538 by reputation lookup module 520. Additionally, as discussed above, logging module 524 may also contain logic configured to process and send data from the click-through telemetry report 536 of the informational interstitial page 534 to the log and click-through telemetry reports 512 of the redirection service 502.

Figure 6:
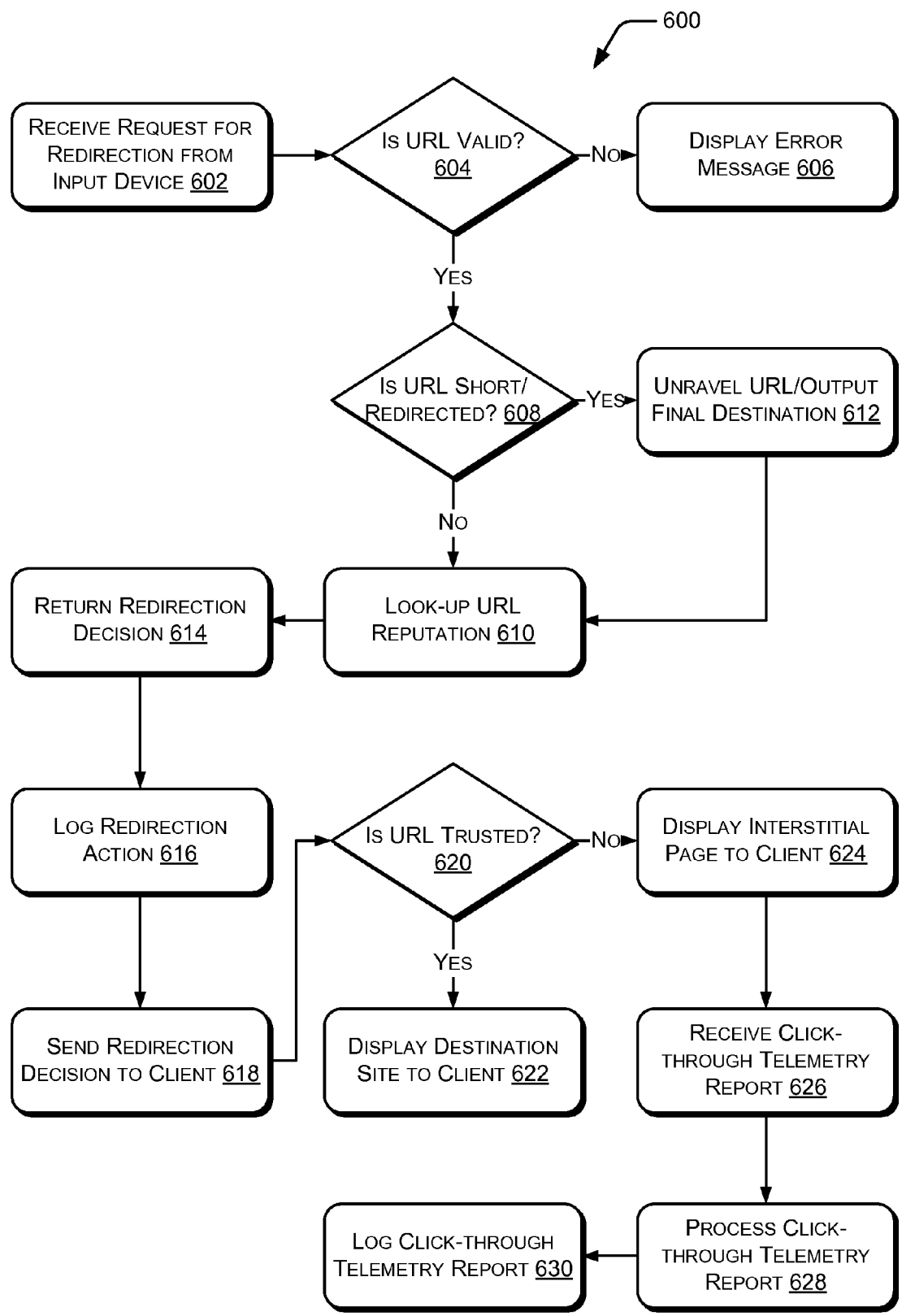
FIG. 6 is a flowchart illustrating details of an illustrative method of reputation based redirection.

FIG. 6 is a flow diagram of one illustrative method 600 for implementing a redirection service. As discussed above, a redirection service may be responsible for redirecting Web users to interstitial Web pages to avoid abusive websites, invalid websites, or Web sites of unknown reputation. The method 600 may, but need not necessarily, be implemented using the reputation based redirection service system 100 shown in FIG. 1. In this particular implementation, the method 600 begins at block 602 in which the method 600 receives a request for redirection at an input device from a user. Generally, the request being received will contain a wrapped URL of a URL selected by a user of a website or Web application. At decision block 604, the method 600 determines whether the URL is valid. If the URL is not valid, meaning it is malformed, contains blanks or is null, or has been tampered with, method 600 may terminate by displaying an error message at block 606. If, on the other hand, the URL is valid, method 600 will determine at decision block 608 whether the URL is a shortened/redirected URL. As discussed above, a shortened URL is a URL that has been transformed into a shorter version by a URL shortening service, and a redirected URL is one that points to a redirection service rather than the final destination. In the case of the redirected URL, the redirection service will then point the user to the final destination. If the URL has been shortened or is a redirected URL, method 600 may unravel the URL and output the final destination URL at block 612, followed by using the reputation lookup module 520 of redirection service 502 to look-up the reputation of the unraveled URL at block 610. If, however, the URL is not shortened or redirected, method 600 may proceed directly to look-up the reputation of the original URL at block 610.

At block 614, the redirection decision may be returned by the redirection logic component 506 based on the URL reputation looked-up at block 610. Method 600 then may log the redirection action at block 616 which may entail storing the redirection decision 532 in the log and click-through telemetry reports 512. At block 618, method 600 may return the redirection decision 532 to the client via the redirection service interface 504. At decision block 620, method 600 determines if the URL is trusted. By way of example, and not limitation, a URL may be trusted because it resides on the same network as the redirection service. In another aspect, the URL may be trusted because the user who posted the URL, or the URL itself, is on a trusted list (e.g., a whitelist).

If the URL is determined to be trusted, method 600 may terminate by displaying the destination site (i.e., the intended destination that the user originally selected) to the client at block 622. On the other hand, if the URL is not trusted, method 600 may display an interstitial page to the client at block 624. As detailed above, the interstitial page may be in the form of an abuse information interstitial page, an unknown information interstitial page, or an error information interstitial page. At block 626, method 600 may receive a click-through telemetry report with data about what action the user chose after being presented with the interstitial page and what results occurred if, and when, the user proceeded to either a known abuse site or an unknown site. Method 600 may then process the click-through telemetry report at block 628 and terminate by logging the click-through telemetry report at block 630.

Illustrative URL Reputation Look-Up Web Service Calls

Figure 7:
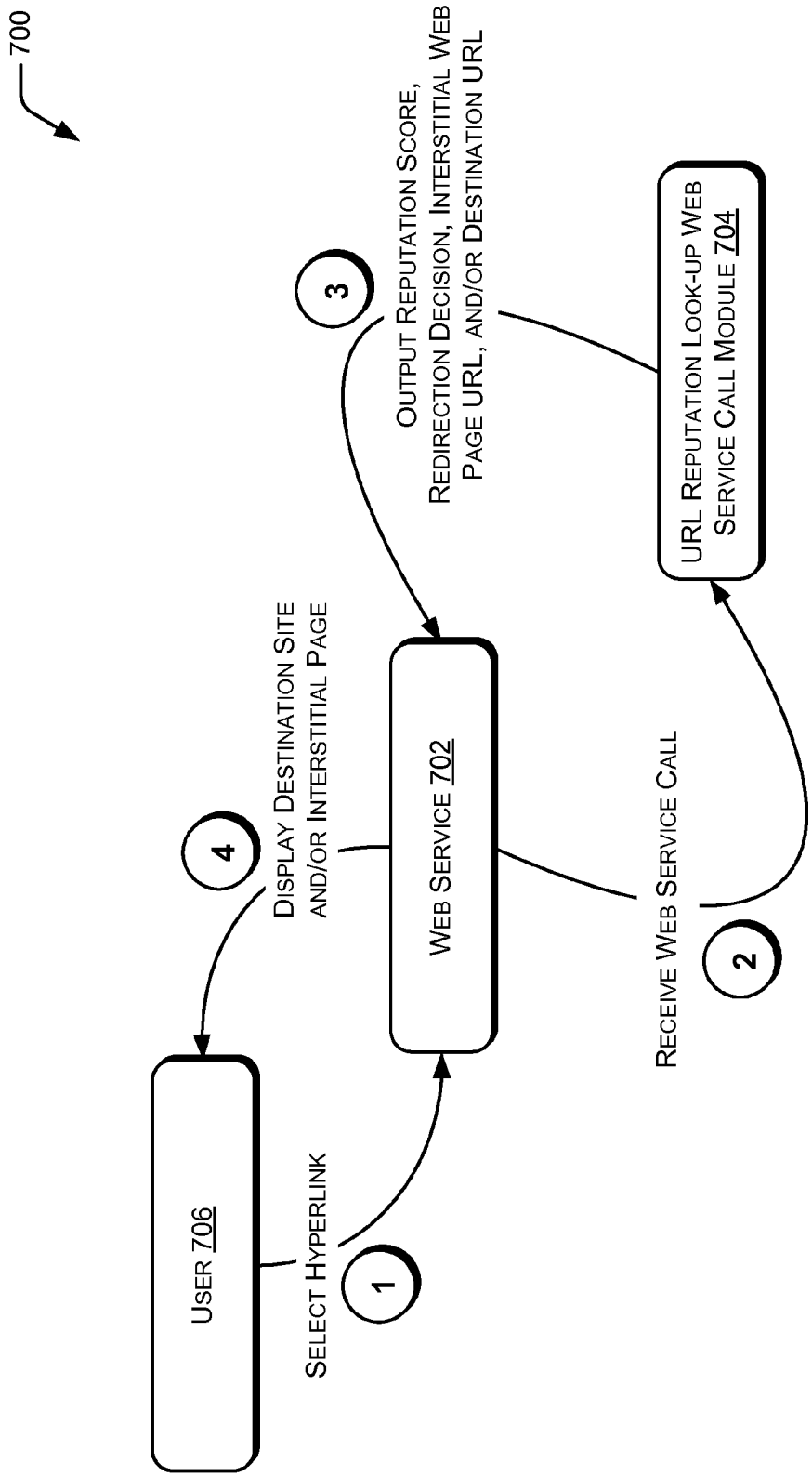
FIG. 7 is a block diagram of an illustrative system for handling URL reputation look-up Web service calls.

FIG. 7 depicts an illustrative block diagram illustrating a system for handling URL reputation look-up Web service calls 700. By way of example, and not limitation, system 700 depicts a Web service 702, a URL reputation look-up Web service call module 704, and a user 706. Web service 702 may be any type of Web service including, but not limited to, a website that offers services to Web users or companies, a Web application that runs remotely on a user machine, or an API that is made available over the Internet for other users and/or machines to access. By way of example, and not limitation, URL reputation look-up Web service call module 704 may function similar to redirection service 502 and may be implemented by method 600. However, URL reputation look-up Web service call module 704 may function differently than redirection service 502 or method 600 while still producing similar results.

In one example, a user may select a hyperlink (1) through Web service 702. URL reputation look-up Web service call module 704 may include, but is not limited to, logic configured to receive a Web service call (2) from Web service 702. As noted above, in one aspect, the Web service call (2) may be a request for a URL reputation look-up based on a hyperlink selected (1) by user 706. In this case, URL reputation look-up Web service call module 704 may contain logic configured to output a reputation score (3) to Web service 702. In another aspect, the Web service call may be a request for reputation based redirection. In this case, URL reputation look-up Web service call module 704 may be configured to output a redirection decision (3) to Web service 702. Alternatively, URL reputation look-up Web service call module 704 may be configured to output one of a plurality of interstitial pages (3) or the destination URL (3) described above rather than, or in conjunction with, the redirection decision. The Web service 702 may then be configured to display the destination website or the returned interstitial page (4) to user 706.

Figure 8:
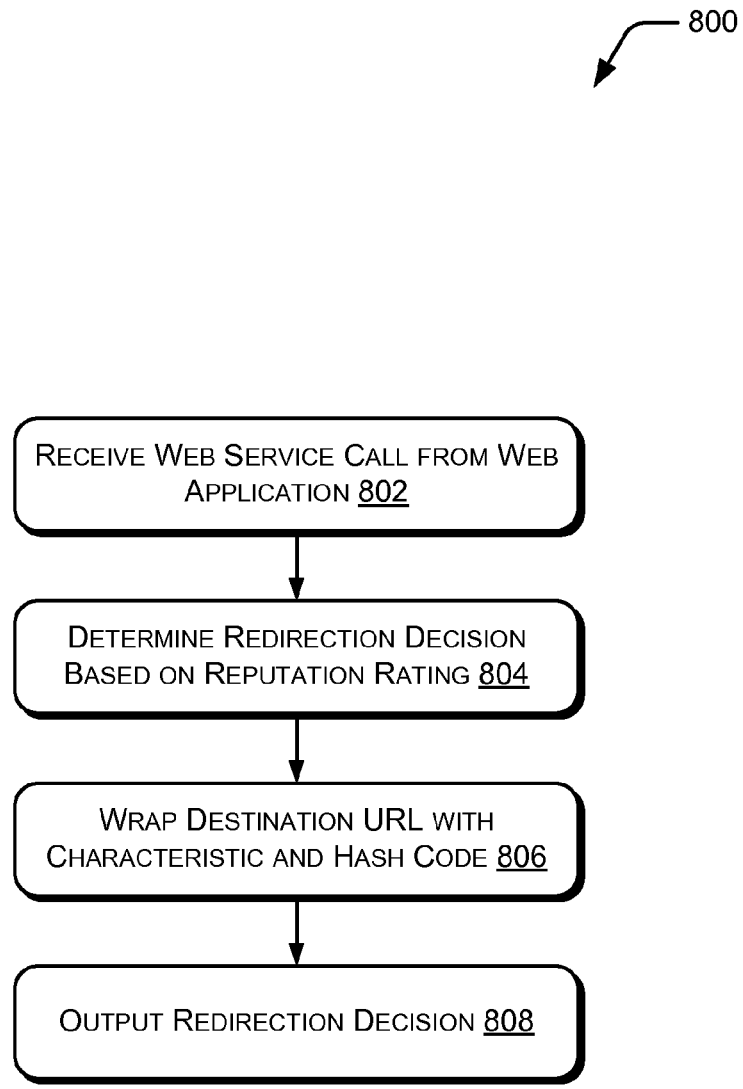
FIG. 8 is a flowchart illustrating details of an illustrative system for handling URL reputation look-up Web service calls.

FIG. 8 is a flow diagram of one illustrative method 800 for implementing URL reputation look-up Web service call system. As discussed above, a URL reputation look-up Web service call system 800 may be responsible for redirecting Web users to interstitial Web pages to avoid abusive websites, invalid websites, or Web sites of unknown reputation or it may be responsible for simply returning redirection decisions. The method 800 may, but need not necessarily, be implemented using the reputation based redirection service system 100 shown in FIG. 1. In this particular implementation, the method 800 begins at block 802 in which the method 800 receives a Web service call for reputation look-up of a destination URL from a Web application. Alternatively, the Web service call may be received from a user, an automated machine, a website, or an application that is not Web enabled. At block 804, method 800 determines a redirection decision based on a reputation rating for the destination URL. Method 800 may then wrap the destination URL with the URLs attributes or characteristics and a security hash code at block 806. In one aspect, the attributes or characteristics may entail the user who originally posted the URL, the URL itself, and/or the location of the originally posted URL. In another aspect, the URL may be wrapped with the URL of a redirection service. In yet another aspect, the URL may be wrapped with only the destination URL (i.e., the URL itself) or it may not be wrapped at all. Method 800 may terminate at block 808 by outputting a redirection decision. As was discussed above, however, method 800 may output appropriate interstitial Web pages for redirection or both a redirection decision and an interstitial page, or plurality of interstitial pages.

FIGS. 1-8 provide simplified examples of suitable reputation based redirection services and URL wrapping systems according to the present disclosure. However, other configurations are also possible. For example, while the applications 104, websites 105, Web document 306, application 530 or website 531, and Web service 702 are all shown as applications or documents available over the Internet, any application or document available over any network could be used. Further, URL wrapping systems and methods may be used on applications and documents not available over a network; for example, plain text documents, word processing documents, other spreadsheet documents, and even Web documents that are not available over any networks but are simply stored locally or on non-networked devices. Additionally, while three types of interstitial pages are shown (e.g., abuse, unknown, and error), any number and/or type of interstitial pages may be used, whether they be informational Web pages as described or documents not available over a network. Further, while specific URL characteristics and attributes are shown with relation to FIG. 3 and other FIGS., any number and/or type of URL characteristics or attributes may be used for URL wrapping.

Illustrative systems and methods of a reputation based redirection service are described above. Some or all of these systems and methods may, but need not, be implemented at least partially by an architecture such as that shown in FIG. 2. It should be understood that certain acts in the methods need not be performed in the order described, may be rearranged, modified, and/or may be omitted entirely, depending on the circumstances. Also, any of the acts described above with respect to any method may be implemented by a processor or other computing device based on instructions stored on one or more computer-readable storage media.

CONCLUSION

Although the invention has been described in language specific to structural features and/or methodological acts, it is to be understood that the invention is not limited to the specific features or acts described. Rather, the specific features and acts are disclosed as illustrative forms of implementing the invention.

What is claimed is:

1. One or more computer-readable storage devices, storing processor-executable instructions that, when executed on a processor, configure a processor to perform acts for Uniform Resource Locator (URL) wrapping, the acts comprising:
   receiving an input of a URL for accessing a document available over a network;
   determining a characteristic associated with the received URL;
   creating a security hash based on the received URL and the characteristic associated with the received URL, wherein the characteristic comprises an identifier of a user who originally posted the received URL;
   outputting a wrapped URL comprising the received URL, the characteristic associated with the received URL, and the security hash;
   validating that the wrapped URL has not been tampered with based at least in part upon authenticating the wrapped URL with the security hash;
   outputting a redirection decision, wherein if the received URL is invalid, abusive, or unknown, the redirection decision redirects a user to a web page; and
   logging the redirection decision and click-through telemetry information associated with the web page.

2. The one or more computer-readable devices of claim 1, wherein creating the security hash is further based on context information comprising a session identifier.

3. The one or more computer-readable devices of claim 1, wherein the characteristic associated with the received URL comprises a location on the network where the received URL was posted and a container identifier of a container where the received URL was posted.

4. The one or more computer-readable devices of claim 1, wherein the characteristic associated with the received URL comprises a unique identifier for back-end reputation look-up and/or back-end additional characteristic look-up.

5. The one or more computer-readable devices of claim 1, further comprising instructions to perform acts comprising:
determining that the received URL is an un-trusted URL; and
outputting the wrapped URL based on the determination that the received URL is an un-trusted URL.

6. The one or more computer-readable devices of claim 1, further comprising instructions to perform acts comprising outputting an error message when the received URL is a malformed URL, a non-URL, a null URL, a URL of an un-supported Uniform Resource Identifier (URI) schema, and/or a URL with a length longer than a predetermined length.

7. The one or more computer-readable devices of claim 1, wherein the wrapped URL further comprises a redirection service and/or shortened URL.

8. The one or more computer-readable devices of claim 1, wherein the characteristic associated with the received URL comprises an identifier associated with an application which posted the received URL.

9. The one or more computer-readable devices of claim 1, wherein the acts further comprise excluding in-network URLs from URL wrapping and directly loading the received URL.

10. A system for implementing a URL redirection service comprising:
memory and a processor;
a policy module, stored in the memory and executable on the processor, configured to exclude URLs on a same network as the URL redirection service from the URL redirection service and to directly load a destination URL on the same network as the URL redirection service;
a redirection server interface module, stored in the memory and executable on the processor, configured to receive a request for handling a wrapped URL comprising the destination URL, a characteristic of the destination URL, and a security hash;
a URL validation/verification module, stored in the memory and executable on the processor, configured to verify that the received wrapped URL has not been tampered with based at least in part upon authenticating the wrapped URL with the security hash;
a reputation lookup module, stored in the memory and executable on the processor, configured to determine a reputation rating for the destination URL;
a redirection logic module, stored in the memory and executable on the processor, configured to output a confidence score and a redirection decision based on validity of the received wrapped URL, the reputation rating of the destination URL, and a characteristic of the destination URL;
a telemetry service module, stored in the memory and executable on the processor, configured to receive click-through telemetry information from an interstitial page; and
a logging module, stored in the memory and executable on the processor, configured to create a telemetry report based on the click-through telemetry information and a log report based on the redirection decision.

11. The system of claim 10, the characteristic associated with the destination URL comprises an identifier of a user who originally posted the destination URL and a location where the destination URL was posted.

12. The system of claim 10, further comprising a shortened/redirected URL handling module, stored in the memory and executable on the processor, configured to:
receive a shortened URL or a redirected URL;
determine a final destination URL of the shortened or redirected URL; and
output the final destination URL to the reputation lookup module.

13. The system of claim 10, further comprising a configuration module, stored in the memory and executable on the processor, configured to maintain system configuration settings in a system configuration store.

14. The system of claim 10, the redirection decision comprising determining, based on the reputation rating of the destination URL, when to display the interstitial page, the interstitial page comprising an abuse information page, an unknown information page, or an error information page.

15. The system of claim 10, the redirection decision comprising determining, based on rules applied to the destination URL or a characteristic of the destination URL, when to display the interstitial page, the interstitial page comprising an abuse information page, an unknown information page, or an error information page.

16. One or more computer-readable storage devices, storing processor-executable instructions that, when executed on a processor, configure the processor to perform acts for URL Web service calls, the acts comprising:
receiving a Web service call for a destination URL;
creating a security hash based on the destination URL and a characteristic associated with the destination URL, wherein the characteristic comprises an identifier of a user who posted the destination URL;
outputting a wrapped URL comprising the destination URL, the characteristic associated with the destination URL, and the security hash;
validating that the wrapped URL has not been tampered with based at least in part upon authenticating the wrapped URL with the security hash;
determining a redirection decision for the destination URL;
outputting the redirection decision, wherein if the destination URL is invalid, abusive, or unknown, the redirection decision redirects a user to a web page; and
logging the redirection decision and click-through telemetry information associated with the web page.

17. The one or more computer-readable devices of claim 16, the redirection decision determined based on a reputation rating of the destination URL.

18. The one or more computer-readable devices of claim 16, wherein the characteristic associated with the destination URL further comprises a website where the URL was originally posted.

19. The one or more computer-readable devices of claim 18, wherein the acts further comprise excluding in-network URLs from URL wrapping and directly loading the destination URL.

20. The one or more computer-readable devices of claim 18, wherein creating the security hash is further based on context information comprising a session identifier.

* * * * *